(12) United States Patent
Zhang

(10) Patent No.: US 11,415,781 B2
(45) Date of Patent: Aug. 16, 2022

(54) MICROOBJECTIVE OPTICAL SYSTEM AND OPTICAL DEVICE

(71) Applicant: CHANGCHUN INSTITUTE OF OPTICS, FINE MECHANICS AND PHYSICS, CHINESE ACADEMY OF SCIENCES, Changchun (CN)

(72) Inventor: Xin Zhang, Changchun (CN)

(73) Assignee: CHANGCHUN INSTITUTE OF OPTICS, FINE MECHANICS AND PHYSICS, CHINESE ACADEMY OF SCIENCES, Changchun (CN)

( * ) Notice: Subject to any disclaimer, the term of this patent is extended or adjusted under 35 U.S.C. 154(b) by 325 days.

(21) Appl. No.: 16/897,311

(22) Filed: Jun. 10, 2020

(65) Prior Publication Data
US 2020/0301115 A1 Sep. 24, 2020

Related U.S. Application Data

(63) Continuation of application No. PCT/CN2019/104307, filed on Sep. 4, 2019.

(30) Foreign Application Priority Data

Sep. 4, 2018 (CN) .......................... 201811028030.8

(51) Int. Cl.
*G02B 17/08* (2006.01)
*G02B 13/00* (2006.01)
(Continued)

(52) U.S. Cl.
CPC ......... *G02B 13/0045* (2013.01); *G02B 13/18* (2013.01); *G02B 17/08* (2013.01); *G02B 21/02* (2013.01)

(58) Field of Classification Search
CPC .... G02B 13/0045; G02B 13/18; G02B 17/08; G02B 21/02; G02B 1/00; G02B 13/00
See application file for complete search history.

(56) References Cited

U.S. PATENT DOCUMENTS 6,842,298 B1 1/2005 Shafer et al.
2004/0240047 A1 12/2004 Shafer et al.
(Continued)

FOREIGN PATENT DOCUMENTS

CN 102906619 A 1/2013
CN 108873289 A 11/2018
(Continued)

OTHER PUBLICATIONS

International Search Report issued in corresponding International application No. PCT/CN2019/104307, dated Dec. 17, 2019.
(Continued)

*Primary Examiner* — Balram T Parbadia

(57) ABSTRACT

The microobjective optical system and the optical device provided in the present disclosure use a catadioptric structure. Specifically, a catadioptric relay lens group and a complex transmissive collimating lens group are combined to effectively correct a higher-order spherical aberration, and control astigmatism, field curvature, and primary and higher-order coma related to a field of view. In a spectrum band ranging from 320 nm to 800 nm, the field of view is larger than 2 mm, a numerical aperture is 1.0, and imaging quality reaches a diffraction limit.

10 Claims, 3 Drawing Sheets

(51) Int. Cl.
*G02B 13/18* (2006.01)
*G02B 21/02* (2006.01)

(56) References Cited

U.S. PATENT DOCUMENTS

| | | |
|---|---|---|
| 2008/0247035 A1 | 10/2008 | Armstrong et al. |
| 2012/0320187 A1* | 12/2012 | Katashiba .......... G02B 17/0808 359/365 |
| 2013/0027603 A1* | 1/2013 | Maezawa ................ G02B 21/04 348/335 |
| 2015/0043063 A1* | 2/2015 | Kajiyama .......... G02B 21/0004 359/365 |
| 2015/0268457 A1* | 9/2015 | Kajiyama ............ G02B 21/365 348/80 |

FOREIGN PATENT DOCUMENTS

| | | |
|---|---|---|
| CN | 208780900 U | 4/2019 |
| JP | 2015118215 A | 6/2015 |

OTHER PUBLICATIONS

Written Opinion of the International Searching Authority for No. PCT/CN2019/104307.

\* cited by examiner

MICROOBJECTIVE OPTICAL SYSTEM AND OPTICAL DEVICE

CROSS-REFERENCE TO RELATED APPLICATIONS

This application is a continuation application of International Application No. PCT/CN2019/104307, filed on Sep. 4, 2019 which claims priority to Chinese Patent Application No. 201811028030.8, filed on Sep. 4, 2018. The disclosures of the aforementioned patent applications are hereby incorporated by reference in their entireties.

TECHNICAL FIELD

The present disclosure relates to the optical field, and in particular, to a microobjective optical system and an optical device.

BACKGROUND

An ultra-high flux microobjective features a large field of view, a large numerical aperture, a wide spectrum band, etc., and is widely used in the fields of biology, metrology, semiconductor detection, etc. A microobjective for gene sequencing in biology is used as an example. A sample to be imaged emits weak fluorescence under the action of laser. The microobjective needs to have a high energy collecting ability for the weak fluorescence, and have high resolution. Therefore, an optical system needs to have a large numerical aperture. In addition, to improve measurement efficiency, the optical system should have a large imaging field of view, which is usually much larger than that of a standard microobjective.

At present, the common technical solution is a transmissive system, which has the following disadvantages: 1. Requirements for a material refractive index and Abbe number tolerance are relatively strict. 2. Under the same index requirement, the transmissive optical system has a longer length, a larger aperture of an optical element, and a larger quantity of lenses. 3. Some special and difficult-to-manufacture optical materials such as calcium fluoride are required to correct a secondary spectrum and a chromatic aberration. Published journals and patents at home and abroad disclose some forms of catadioptric structures. For example, U.S. Pat. No. 8,675,276 discloses a catadioptric imaging system for broad band microscopy. However, a field of view designed for the system is small, and an object space view of a typical system is 0.15 mm. Because an aberration related to the field of view is not corrected and balanced in the existing technologies, especially astigmatism, field curvature, and primary and higher-order coma, an imaging field of view implemented is small and a wavefront aberration is large.

SUMMARY

In view of the foregoing description, embodiments of the present disclosure provide a microobjective optical system and an optical device, to effectively correct a higher-order spherical aberration, and control astigmatism, field curvature, and primary and higher-order coma related to a field of view. In a spectrum band ranging from 320 nm to 800 nm, the field of view is larger than 2 mm, a numerical aperture is 1.0, and imaging quality reaches a diffraction limit.

According to a first aspect, the present disclosure provides a microobjective optical system, including a relay lens group and a collimating lens group that are separated by an intermediate image surface, where the relay lens group successively includes a second lens of positive focal power, a third lens of negative focal power, and a fourth lens of negative focal power along an optical axis; a first surface of the second lens that is facing an object surface has a first transmission area; the third lens is a meniscus lens, centers of curvature of two surfaces of the third lens are both located on one side of the object surface, a central area of a second surface of the third lens is a second transmission area, and a liquid medium is provided between the second lens and the object surface;

the collimating lens group successively includes a fifth lens of positive focal power, a sixth lens of positive focal power, a seventh lens of positive focal power, an eighth lens of negative focal power, a ninth lens of positive focal power, a tenth lens of positive focal power, an eleventh lens of positive focal power, a twelfth lens of negative focal power, and a thirteenth lens of negative focal power along the optical axis, where the fifth lens, the sixth lens, the seventh lens, the ninth lens, and a fourteenth lens are biconvex lenses, the eighth lens, the eleventh lens, the twelfth lens, and the thirteenth lens are meniscus lenses and their surfaces are all bent toward the side of the object surface, and the tenth lens is a biconcave lens;

photon energy emitted from the object surface successively passes through the liquid medium, the first transmission area of the second lens, a second surface of the second lens, and a first surface of the third lens, and then is reflected by an internal reflection area of the second surface of the third lens and returned to the first surface of the third lens; then passes through the second surface of the second lens and arrives at the first surface of the second lens, and then is reflected by an internal reflection area of the first surface of the second lens and returned to the second surface of the second lens; enters the first surface of the third lens, passes through the second transmission area at the center of the second surface of the third lens and enters the fourth lens, and then is converged to the intermediate image surface; photon energy of the intermediate image surface continues to propagate and successively pass through the fifth lens, the sixth lens, the seventh lens, the eighth lens, the ninth lens, the tenth lens, the eleventh lens, the twelfth lens, the thirteenth lens, and the fourteenth lens to form parallel light and the parallel light is emitted to the outside of the optical system.

Optionally, the micro objective optical system further includes a first lens having no focal power, where the first lens and the second lens are a group of agglutination lenses, the first lens is disposed on a side of the second lens that is facing the object surface, and the first transmission area is disposed in an area in which the first surface of the second lens is glued to the first lens.

Optionally, the first lens is a parallel plat having no focal power, a spherical lens, or an aspherical lens.

Optionally, the first surface of the second lens may be a plane, a spherical lens, or an aspherical lens.

Optionally, the first lens, the second lens, the third lens, the fourth lens, the fifth lens, the sixth lens, the seventh lens, the eighth lens, the ninth lens, the eleventh lens, the twelfth lens, the thirteenth lens, and the fourteenth lens are all made of fused quartz or calcium fluoride.

Optionally, an aperture diaphragm is further provided between the eighth lens and the ninth lens.

Optionally, the liquid medium is water or biological immersion liquid.

Optionally, optical parameters of the microobjective optical system are specifically shown in the following table:

| Surface sequence number | Name | Radius of curvature | Interval (mm) | Thickness (mm) | Material | Semiaperture (mm) |
|---|---|---|---|---|---|---|
| 0 | Object surface | Infinite | 0.15 | — | Water | 1.04 |
| 1 | First lens | Infinite | — | 3.00 | Fused quartz | 1.28 |
| 2 | Second lens | Infinite | — | 22.50 | Fused quartz | 3.77 |
| 3 | | −88.2 | 11.20 | — | — | 21.86 |
| 4 | Third lens | −36.5 | — | 6.50 | Fused quartz | 26.44 |
| 5 | | −48.9 | −6.5 | — | Reflector | 33.24 |
| 6 | | −36.5 | −11.20 | — | | 28.85 |
| 7 | Second lens | −88.2 | — | −22.50 | Fused quartz | 28.12 |
| 8 | | Infinite | 22.50 | — | Reflector | 21.79 |
| 9 | | −88.2 | 11.20 | | | 14.21 |
| 10 | Third lens | −36.5 | | 6.50 | Fused quartz | 7.16 |
| 11 | | −48.9 | 1.20 | | | 4.86 |
| 12 | Fourth lens | 24.3 | | 2.20 | Fused quartz | 3.98 |
| 13 | | 13.0 | 2.10 | | | 3.12 |
| 14 | Intermediate image plane | Infinite | 2.00 | | | 2.31 |
| 15 | Fifth lens | 60.1 | | 2.50 | Fused quartz | 2.89 |
| 16 | | −40.1 | 0.60 | | | 3.79 |
| 17 | Sixth lens | 80.5 | | 14.00 | Fused quartz | 4.26 |
| 18 | | −16.9 | 0.55 | | | 8.38 |
| 19 | Seventh lens | 25.2 | | 4.50 | Fused quartz | 9.61 |
| 20 | | −75.5 | 17.95 | | | 9.68 |
| 21 | Eighth lens | −13.5 | | 3.52 | Fused quartz | 9.63 |
| 22 | | −18.7 | 0.00 | | | 10.87 |
| 23 | Aperture diaphragm | Infinite | 0.50 | | | 11.31 |
| 24 | Ninth lens | 30.4 | | 8.20 | Fused quartz | 12.26 |
| 25 | | −34.5 | 16.90 | | | 12.41 |
| 26 | Tenth lens | −19.4 | | 3.49 | Fused quartz | 10.66 |
| 27 | | 34.1 | 4.20 | | | 11.82 |
| 28 | Eleventh lens | −60.5 | | 5.48 | Fused quartz | 12.15 |
| 29 | | −35.7 | 4.20 | | | 13.55 |
| 30 | Twelfth lens | −18.9 | | 4.52 | Fused quartz | 13.81 |
| 31 | | −24.7 | 0.52 | | | 16.15 |
| 32 | Thirteenth lens | −359.6 | | 7.55 | Fused quartz | 18.46 |
| 33 | | −50.1 | 0.55 | | | 19.55 |
| 34 | Fourteenth lens | 91.2 | | 7.50 | Fused quartz | 20.97 |
| 35 | | −546.7 | 0.00 | | | 21.22 |
| 36 | Image surface | Infinite | | | | |

Optionally, optical surfaces of all lenses in the system are spherical lenses or aspherical lenses.

According to a second aspect, the present disclosure provides an optical device, including the foregoing microobjective optical system.

It can be learned from the foregoing technical solutions that the embodiments of the present disclosure have the following advantages:

The microobjective optical system and the optical device provided in the present disclosure use a catadioptric structure. Specifically, a catadioptric relay lens group and a complex transmissive collimating lens group are combined to effectively correct a higher-order spherical aberration, and control astigmatism, field curvature, and primary and higher-order coma related to a field of view. In a spectrum band ranging from 320 nm to 800 nm, the field of view is larger than 2 mm, a numerical aperture is 1.0, and imaging quality reaches a diffraction limit.

REFERENCE NUMERALS

L1: first lens; L2: second lens; L3: third lens; L4: fourth lens; L5: fifth lens; L6: sixth lens; L7: seventh lens; L8: eighth lens; L9: ninth lens; L10: tenth lens; L1: eleventh lens; L12: twelfth lens; L13: thirteenth lens; L14: fourteenth lens; 101: object surface; 102: intermediate image surface; 103: aperture diaphragm; 201: first surface of the second lens; 202: second surface of the second lens; 301: first surface of the third lens; 302: second surface of the third lens.

DESCRIPTION OF EMBODIMENTS

To make a person skilled in the art understand the technical solutions in the present disclosure better, the following clearly and comprehensively describes the technical solutions in the embodiments of the present disclosure with reference to the accompanying drawings in the embodiments of the present disclosure. Clearly, the described embodiments are merely some rather than all of the embodiments of the present disclosure. All other embodiments obtained by a person of ordinary skill in the art based on the embodiments of the present disclosure without creative efforts shall fall within the protection scope of the present disclosure.

In the specification, claims, and accompanying drawings of the present disclosure, the terms "first", "second", "third", "fourth", and the like are intended to distinguish between similar objects, but do not necessarily indicate a specific order or sequence. It should be understood that, the terms used in such a way are interchangeable in proper circumstances, so that the embodiments described herein can be implemented in other orders than the order illustrated or described herein. Moreover, the terms "include", "contain", and any other variants mean to cover the non-exclusive inclusion, for example, a process, method, system, product, or device that includes a list of steps or units is not necessarily limited to those steps or units, but may include other steps or units not expressly listed or inherent to such a process, method, product, or device.

Figure 1:
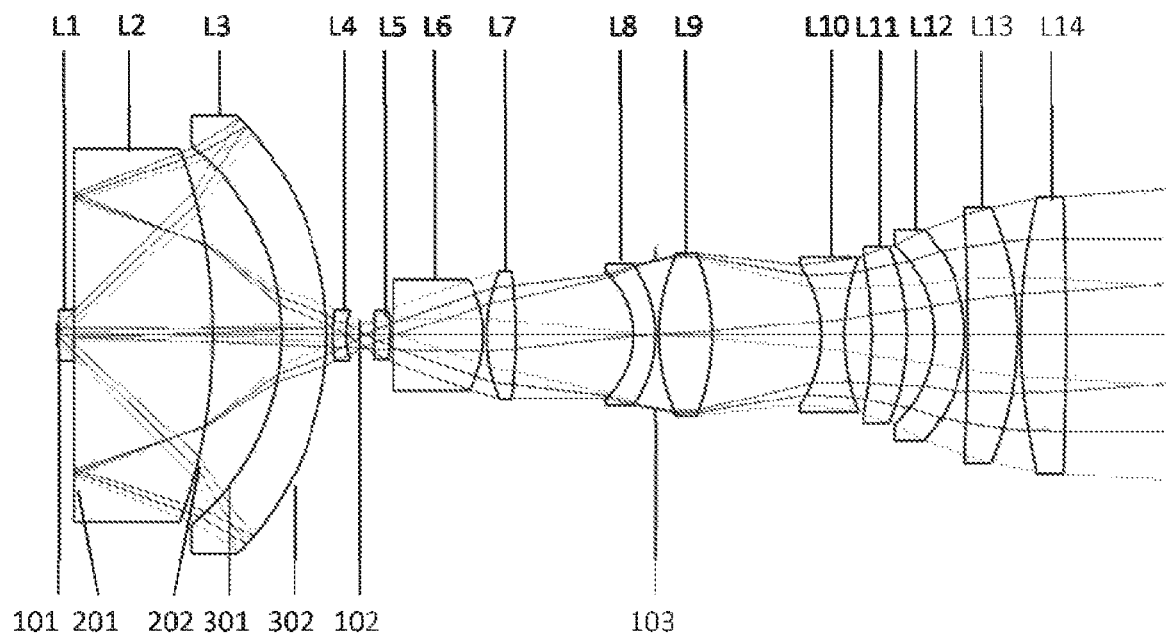
FIG. 1 is a diagram of a structure and an optical path of a microobjective optical system according to an embodiment of the present disclosure.

With reference to FIG. 1, an embodiment of the present disclosure provides a microobjective optical system that uses a catadioptric structure. The system includes a relay lens group and a collimating lens group that are separated by an intermediate image surface 102, where the relay lens group successively includes a second lens L2 of positive focal power, a third lens L3 of negative focal power, and a fourth lens L4 of negative focal power along an optical axis; a first surface of the second lens L2 that is facing an object surface 101 has a first transmission area; the third lens L3 is a meniscus lens, centers of curvature of two surfaces of the third lens L3 are both located on one side of the object surface 101, a central area of a second surface 302 of the third lens is a second transmission area, another area of the third lens L3 different from the second transmission area is a second internal reflection area, and a liquid medium is provided between the second lens and the object surface 101; the collimating lens group successively includes a fifth lens L5 of positive focal power, a sixth lens L6 of positive focal power, a seventh lens L7 of positive focal power, an eighth lens L8 of negative focal power, a ninth lens L9 of positive focal power, a tenth lens L10 of positive focal power, an eleventh lens L11 of positive focal power, a twelfth lens L12 of negative focal power, and a thirteenth lens L13 of negative focal power along the optical axis, where the fifth lens L5, the sixth lens L6, the seventh lens L7, the ninth lens L9, and a fourteenth lens L14 are biconvex lenses, the eighth lens L8, the eleventh lens L11, the twelfth lens L12, and the thirteenth lens L13 are meniscus lenses and their surfaces are all bent toward the side of the object surface 101, and the tenth lens L10 is a biconcave lens; photon energy emitted from the object surface 101 successively passes through the liquid medium, the first transmission area of the second lens L2, a second surface 202 of the second lens, and a first surface 301 of the third lens, and then is reflected by an internal reflection area of the second surface 302 of the third lens and returned to the first surface 301 of the third lens; then passes through the second surface 202 of the second lens and arrives at the first surface 201 of the second lens, and then is reflected by an internal reflection area of the first surface 201 of the second lens and returned to the second surface 202 of the second lens; enters the first surface 301 of the third lens, passes through the second transmission area at the center of the second surface 302 of the third lens and enters the fourth lens L4, and then is converged to the intermediate image surface 102; photon energy of the intermediate image surface 102 continues to propagate and successively pass through the fifth lens L5, the sixth lens L6, the seventh lens L7, the eighth lens L8, the ninth lens L9, the tenth lens L10, the eleventh lens L11, the twelfth lens L12, the thirteenth lens L13, and the fourteenth lens L14 to form parallel light and the parallel light is emitted to the outside of the optical system. Photon energy emitted from a sample on the object surface 101 is collimated into parallel light to implement infinite conjugation, and resolve the design problems of an optical imaging field of view and a diffraction limit of a wavefront aberration. A microobjective uses a catadioptric structure formed by one or more materials, to effectively balance an aberration related to the field of view.

Optionally, the microobjective optical system further includes a first lens L having no focal power, where the first lens L1 and the second lens L2 are a group of agglutination lenses, another area of the second lens L2 different from the first transmission area is a first internal reflection area, the first lens L1 is disposed on a side of the second lens L2 that is facing the object surface 101, and the first transmission area is disposed in an area in which the first surface 201 of the second lens is glued to the first lens L1. The first lens L1 may be a parallel plate having no focal power, a spherical lens, or an aspherical lens. It should be noted that the first lens L1 may be omitted.

The relay lens group includes four lenses: one parallel plate, two catadioptric lenses, and one lens. The relay lens group is used to make the object surface 101 form a magnified real image, that is, an intermediate image plane, whose magnification rate may be −1.8 to −2.0. The collimating lens group includes ten lenses, and is used to collimate light from the intermediate image plane into parallel light and emit the parallel light to the outside of the system.

Correspondingly, the first surface 201 of the second lens may be a plane or a spherical surface. To be specific, when the first lens L1 is a parallel plate having no focal power, the first surface 201 of the second lens is designed as a plane; when the second lens L2 is a spherical lens, the first surface 201 of the second lens is correspondingly designed as a spherical surface, so as to ensure good bonding when the surface is glued.

For materials of the lenses, in this embodiment, the first lens L1, the second lens L2, the third lens L3, the fourth lens L4, the fifth lens L5, the sixth lens L6, the seventh lens L7, the eighth lens L8, the ninth lens L9, the eleventh lens L11, the twelfth lens L12, the thirteenth lens L13, and the fourteenth lens L14 are all made of fused quartz. A fused quartz lens has technical features such as a smaller chromatic aberration, less central obscuration, object-side telecentric, and low distortion.

Optionally, an aperture diaphragm 103 is further provided between the eighth lens L8 and the ninth lens L9. The aperture diaphragm 103 is configured to adjust an imaging beam. A position of the aperture diaphragm 103 and a size of a clear aperture are directly related to brightness, definition, and magnitudes of some aberrations of an image formed by the optical system. A smaller clear aperture of the diaphragm leads to a small spherical aberration, a clearer image, and a larger depth of field, but weaker brightness of the image. A larger clear aperture leads to stronger brightness of the image, but a larger spherical aberration, lower definition of the image, and a smaller depth of field.

In this embodiment, the liquid medium is water or biological immersion liquid, which is not limited.

Optical parameters of the microobjective optical system provided in the present disclosure are specifically shown in the following table:

| Surface sequence number | Name | Radius of curvature | Interval (mm) | Thickness (mm) | Material | Semiaperture (mm) |
|---|---|---|---|---|---|---|
| 0 | Object surface | Infinite | 0.15 | — | Water | 1.04 |
| 1 | First lens | Infinite | — | 3.00 | Fused quartz | 1.28 |
| 2 | Second lens | Infinite | — | 22.50 | Fused quartz | 3.77 |
| 3 | | −88.2 | 11.20 | — | | 21.86 |
| 4 | Third lens | −36.5 | — | 6.50 | Fused quartz | 26.44 |
| 5 | | −48.9 | −6.5 | — | Reflector | 33.24 |
| 6 | | −36.5 | −11.20 | — | | 28.85 |
| 7 | Second lens (reused) | −88.2 | — | −22.50 | Fused quartz | 28.12 |
| 8 | | Infinite | 22.50 | — | Reflector | 21.79 |
| 9 | | −88.2 | 11.20 | | | 14.21 |
| 10 | Third lens (reused) | −36.5 | | 6.50 | Fused quartz | 7.16 |
| 11 | | −48.9 | 1.20 | | | 4.86 |
| 12 | Fourth lens | 24.3 | | 2.20 | Fused quartz | 3.98 |
| 13 | | 13.0 | 2.10 | | | 3.12 |
| 14 | Intermediate image plane | Infinite | 2.00 | | | 2.31 |
| 15 | Fifth lens | 60.1 | | 2.50 | Fused quartz | 2.89 |
| 16 | | −40.1 | 0.60 | | | 3.79 |
| 17 | Sixth lens | 80.5 | | 14.00 | Fused quartz | 4.26 |
| 18 | | −16.9 | 0.55 | | | 8.38 |
| 19 | Seventh lens | 25.2 | | 4.50 | Fused quartz | 9.61 |
| 20 | | −75.5 | 17.95 | | | 9.68 |
| 21 | Eighth lens | −13.5 | | 3.52 | Fused quartz | 9.63 |
| 22 | | −18.7 | 0.00 | | | 10.87 |
| 23 | Aperture diaphragm | Infinite | 0.50 | | | 11.31 |
| 24 | Ninth lens | 30.4 | | 8.20 | Fused quartz | 12.26 |
| 25 | | −34.5 | 16.90 | | | 12.41 |
| 26 | Tenth lens | −19.4 | | 3.49 | Fused quartz | 10.66 |
| 27 | | 34.1 | 4.20 | | | 11.82 |
| 28 | Eleventh lens | −60.5 | | 5.48 | Fused quartz | 12.15 |
| 29 | | −35.7 | 4.20 | | | 13.55 |
| 30 | Twelfth lens | −18.9 | | 4.52 | Fused quartz | 13.81 |
| 31 | | −24.7 | 0.52 | | | 16.15 |
| 32 | Thirteenth lens | −359.6 | | 7.55 | Fused quartz | 18.46 |
| 33 | | −50.1 | 0.55 | | | 19.55 |
| 34 | Fourteenth lens | 91.2 | | 7.50 | Fused quartz | 20.97 |
| 35 | | −546.7 | 0.00 | | | 21.22 |
| 36 | Image surface | Infinite | | | | |

In this embodiment, optical surfaces of all lenses in the system are spherical lenses or aspherical lenses. That is, the optical surfaces of the first lens, the second lens, . . . , the thirteenth lens, and the fourteenth lens are all spherical lenses or aspherical lenses.

The microobjective optical system provided in the present disclosure effectively corrects a higher-order spherical aberration, and controls astigmatism, field curvature, and primary and higher-order coma related to a field of view. In a spectrum band ranging from 320 nm to 800 nm, the field of view is larger than 2 mm, a numerical aperture is 1.0, and imaging quality reaches a diffraction limit.

The microobjective optical system in the present disclosure uses the collimating lens group that includes ten lenses, to correct primary and higher-order spherical aberrations of the relay lens group, especially higher-order astigmatism and higher-order field curvature related to the field of view, and finally implement design for a large field of view. The microobjective optical system provided in the present disclosure further features a compact structure.

Technical specifications of the microobjective optical system in the present disclosure are shown in Table 1.

TABLE 1

| Technical specifications of the microobjective optical system | |
|---|---|
| Operating band | 320 nm to 800 nm |
| Object-side field of view | 2.08 mm |
| Object-side numerical aperture (NA) | 1.0 |
| Optical length (from the object surface 101 to the lens L14) | ≤160 mm |

Figure 2:
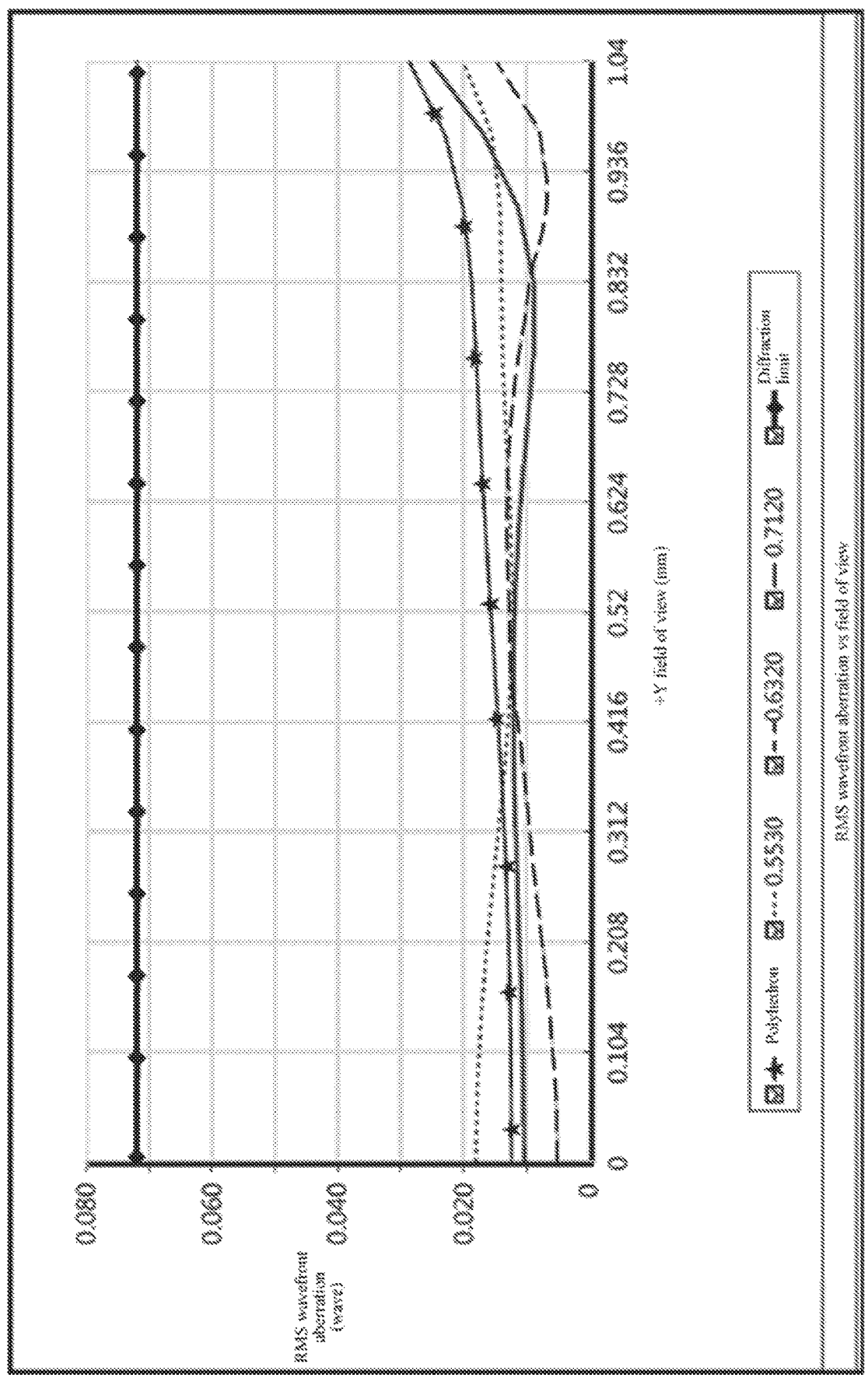
FIG. 2 is a curve diagram showing a variation of a wavefront aberration with a field of view of a microobjective optical system according to an embodiment of the present disclosure.
Figure 3:
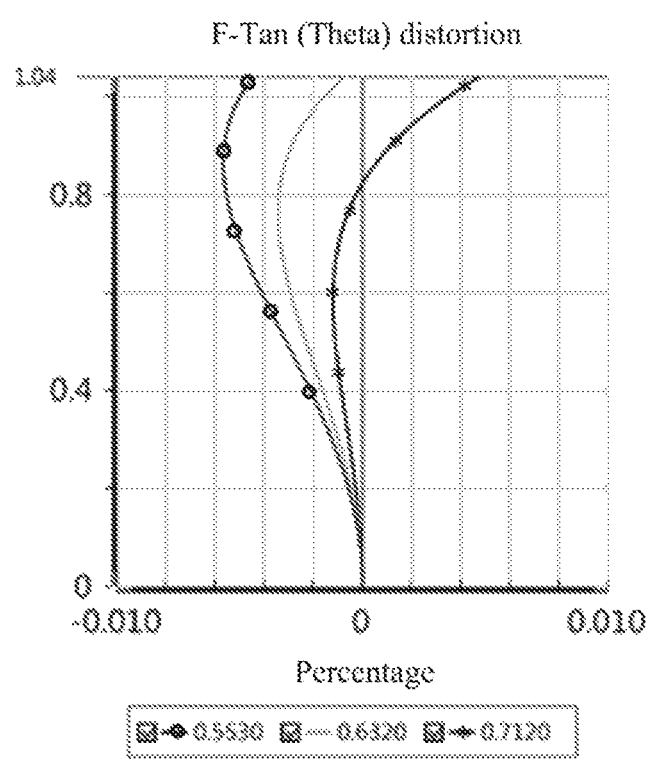
FIG. 3 shows a relative distortion curve of a microobjective optical system according to an embodiment of the present disclosure.

Effects of the present disclosure are proven based on experimental data in the following. Specifically, as shown in FIG. 2, the horizontal coordinate represents a half field of view, which is measured in millimeters and whose maximum value is 1.04 mm. The vertical coordinate represents an RMS wavefront aberration, which is measured in wavelengths $\lambda$ ($\lambda$=632 nm). The solid line with stars represents a curve showing a variation of a wavefront aberration with a field of view of the microobjective optical system when three main operating wavelengths are considered. The dotted line represents a curve showing a variation of a wavefront aberration with a field of view of the microobjective optical system at an operating wavelength of 553 nm. The dashed line represents a curve showing a variation of a wavefront aberration with a field of view of the microobjective optical system at an operating wavelength of 632 nm. The solid line represents a curve showing a variation of a wavefront aberration with a field of view of the microobjective optical system at an operating wavelength of 712 nm. It can be seen from FIG. 2 that the wavefront aberration of the full field of view in the operating band is less than 0.029$\lambda$. As shown in FIG. 3, the horizontal coordinate represents relative distortion, which is measured in percentage. The vertical coordinate represents an object-side field of view. The curves in FIG. 3 are the relative distortion curves of the operating wavelengths 553 nm, 632 nm, and 712 nm, respectively. The limit in the range of the full field of view is less than 0.006%. The variation of the wavefront aberration with the field of view of the microobjective optical system in each spectrum band is shown in FIG. 2. The wavefront aberration of the full field of view is 0.025$\lambda$ to 0.030$\lambda$ ($\lambda$=632 nm). The distortion curves of the microobjective optical system are shown in FIG. 3. The relative distortion of the full field of view is less than 0.006%.

According to a second aspect, the present disclosure provides an optical device, including the foregoing microobjective optical system. The microobjective optical system effectively corrects a higher-order spherical aberration, and controls astigmatism, field curvature, and primary and higher-order coma related to a field of view. In a spectrum band ranging from 320 nm to 800 nm, the field of view is larger than 2 mm, a numerical aperture is 1.0, and imaging quality reaches a diffraction limit.

It may be clearly understood by a person skilled in the art that, for ease and brevity of description, for a detailed working process of the foregoing system, apparatus, and unit, references can be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate components may or may not be physically separate, and components displayed as units may or may not be physical units, may be located in one position, or may be distributed on a plurality of network units. Some or all of the units may be selected depending on actual needs to achieve the purposes of the solutions of the embodiments.

In addition, functional units in the embodiments of the present disclosure may be integrated into one processing unit, each of the units may exist alone physically, or two or more units may be integrated into one unit. The integrated unit may be implemented in a form of hardware, or may be implemented in a form of a software functional unit.

A person of ordinary skill in the art may understand that all or some of the steps of the methods in the embodiments may be implemented by a program instructing related hardware. The program may be stored in a computer readable storage medium. The storage medium may include a read-only memory (ROM), a random access memory (RAM), a magnetic disk, an optical disc, or the like.

The microobjective optical system and the optical device provided in the present disclosure are described in detail above. A person of ordinary skill in the art can make variations and modifications to the present disclosure in terms of the specific implementations and application scopes according to the ideas of the embodiments of the present disclosure. Therefore, the content of this specification shall not be construed as a limitation on the present disclosure.

What is claimed is:

1. A microobjective optical system, comprising a relay lens group and a collimating lens group that are separated by an intermediate image surface, wherein the relay lens group successively comprises a second lens of positive focal power, a third lens of negative focal power, and a fourth lens of negative focal power along an optical axis; a first surface of the second lens that is facing an object surface has a first transmission area; the third lens is a meniscus lens, centers of curvature of two surfaces of the third lens are both located on one side of the object surface, a central area of a second surface of the third lens is a second transmission area, and a liquid medium is provided between the second lens and the object surface;

the collimating lens group successively comprises a fifth lens of positive focal power, a sixth lens of positive focal power, a seventh lens of positive focal power, an eighth lens of negative focal power, a ninth lens of positive focal power, a tenth lens of positive focal power, an eleventh lens of positive focal power, a twelfth lens of negative focal power, and a thirteenth lens of negative focal power along the optical axis, wherein the fifth lens, the sixth lens, the seventh lens, the ninth lens, and a fourteenth lens are biconvex lenses, the eighth lens, the eleventh lens, the twelfth lens, and the thirteenth lens are meniscus lenses and their surfaces are all bent toward the side of the object surface, and the tenth lens is a biconcave lens; and photon energy emitted from the object surface successively passes through the liquid medium, the first transmission area of the second lens, a second surface of the second lens, and a first surface of the third lens, and then is reflected by an internal reflection area of the second surface of the third lens and returned to the first surface of the third lens; then passes through the second surface of the second lens and arrives at the first surface of the second lens, and then is reflected by an internal reflection area of the first surface of the second lens and returned to the second surface of the second lens; enters the first surface of the third lens, passes through the second transmission area at the center of the second surface of the third lens and enters the fourth lens, and then is converged to the intermediate image surface; photon energy of the intermediate image surface continues to propagate and successively pass through the fifth lens, the sixth lens, the seventh lens, the eighth lens, the ninth lens, the tenth lens, the eleventh lens, the twelfth lens, the thirteenth lens, and the fourteenth lens to form parallel light and the parallel light is emitted to the outside of the optical system.

2. The microobjective optical system according to claim 1, further comprising a first lens having no focal power, wherein the first lens and the second lens are a group of agglutination lenses, the first lens is disposed on a side of the second lens that is facing the object surface, and the first transmission area is disposed in an area in which the first surface of the second lens is glued to the first lens.

3. The microobjective optical system according to claim 2, wherein the first lens is a parallel plate having no focal power, a spherical lens, or an aspherical lens.

4. The microobjective optical system according to claim 2, wherein the first lens, the second lens, the third lens, the fourth lens, the fifth lens, the sixth lens, the seventh lens, the eighth lens, the ninth lens, the eleventh lens, the twelfth lens, the thirteenth lens, and the fourteenth lens are all made of fused quartz or calcium fluoride.

5. The microobjective optical system according to claim 2, wherein the liquid medium is water or biological immersion liquid.

6. The microobjective optical system according to claim 5, wherein optical parameters of the microobjective optical system are specifically shown in the following table:

| Surface sequence number | Name | Radius of curvature | Interval (mm) | Thickness (mm) | Material | Semiaperture (mm) |
| --- | --- | --- | --- | --- | --- | --- |
| 0 | Object surface | Infinite | 0.15 | — | Water | 1.04 |
| 1 | First lens | Infinite | — | 3.00 | Fused quartz | 1.28 |
| 2 | Second lens | Infinite | — | 22.50 | Fused quartz | 3.77 |
| 3 | | −88.2 | 11.20 | — | — | 21.86 |
| 4 | Third lens | −36.5 | — | 6.50 | Fused quartz | 26.44 |
| 5 | | −48.9 | −6.5 | — | Reflector | 33.24 |
| 6 | | −36.5 | −11.20 | — | — | 28.85 |
| 7 | Second lens | −88.2 | — | −22.50 | Fused quartz | 28.12 |
| 8 | | Infinite | 22.50 | — | Reflector | 21.79 |
| 9 | | −88.2 | 11.20 | | | 14.21 |
| 10 | Third lens | −36.5 | | 6.50 | Fused quartz | 7.16 |
| 11 | | −48.9 | 1.20 | | | 4.86 |
| 12 | Fourth lens | 24.3 | | 2.20 | Fused quartz | 3.98 |
| 13 | | 13.0 | 2.10 | | | 3.12 |
| 14 | Intermediate image plane | Infinite | 2.00 | | | 2.31 |
| 15 | Fifth lens | 60.1 | | 2.50 | Fused quartz | 2.89 |
| 16 | | −40.1 | 0.60 | | | 3.79 |
| 17 | Sixth lens | 80.5 | | 14.00 | Fused quartz | 4.26 |
| 18 | | −16.9 | 0.55 | | | 8.38 |
| 19 | Seventh lens | 25.2 | | 4.50 | Fused quartz | 9.61 |
| 20 | | −75.5 | 17.95 | | | 9.68 |
| 21 | Eighth lens | −13.5 | | 3.52 | Fused quartz | 9.63 |
| 22 | | −18.7 | 0.00 | | | 10.87 |
| 23 | Aperture diaphragm | Infinite | 0.50 | | | 11.31 |

-continued

| Surface sequence number | Name | Radius of curvature | Interval (mm) | Thickness (mm) | Material | Semiaperture (mm) |
|---|---|---|---|---|---|---|
| 24 | Ninth lens | 30.4 | | 8.20 | Fused quartz | 12.26 |
| 25 | | −34.5 | 16.90 | | | 12.41 |
| 26 | Tenth lens | −19.4 | | 3.49 | Fused quartz | 10.66 |
| 27 | | 34.1 | 4.20 | | | 11.82 |
| 28 | Eleventh lens | −60.5 | | 5.48 | Fused quartz | 12.15 |
| 29 | | −35.7 | 4.20 | | | 13.55 |
| 30 | Twelfth lens | −18.9 | | 4.52 | Fused quartz | 13.81 |
| 31 | | −24.7 | 0.52 | | | 16.15 |
| 32 | Thirteenth lens | −359.6 | | 7.55 | Fused quartz | 18.46 |
| 33 | | −50.1 | 0.55 | | | 19.55 |
| 34 | Fourteenth lens | 91.2 | | 7.50 | Fused quartz | 20.97 |
| 35 | | −546.7 | 0.00 | | | 21.22 |
| 36 | Image surface | Infinite | | | | |

7. The microobjective optical system according to claim 2, wherein optical surfaces of all lenses in the system are spherical lenses or aspherical lenses.

8. The microobjective optical system according to claim 1, wherein the first surface of the second lens may be a plane or a spherical surface.

9. The microobjective optical system according to claim 1, wherein an aperture diaphragm is further provided between the eighth lens and the ninth lens.

10. An optical device, comprising the microobjective optical system according to claim 1.

* * * * *